United States Patent Office 3,357,950
Patented Dec. 12, 1967

3,357,950
PROCESS FOR MAKING A RESINOUS DENTIFRICE CLEANING AGENT
Elwood L. La Follette, Lawrenceburg, Ind., assignor to The Procter & Gamble Company, Cincinnati, Ohio, a corporation of Ohio
No Drawing. Filed June 17, 1965, Ser. No. 464,829
2 Claims. (Cl. 260—59)

This invention relates to a process for preparing a particulate synthetic resin. More specifically, the invention involves the preparation of a phenol-formaldehyde resin for use as a cleaning agent in a dentifrice.

U.S. Patent 3,070,510, issued Dec. 25, 1962, to William E. Cooley et al. teaches dentifrice compositions which utilize finely divided, highly polymerized, thermosetting resins as the essential cleaning and polishing agent. The resins of Cooley et al. find excellent use in a dentifrice because (1) they exhibit a high cleaning to abrasion ratio, i.e., they clean the teeth well without adversely affecting the dental enamel and (2) they are very compatible with advantageous dentifrice ionic ingredients such as stannous fluoride.

Cooley et al. disclose that phenol-formaldehyde resins are desirable from the standpoint of compatibility with ionic ingredients but they are generally not useful in a white dentifrice because "most of these resins [phenol-formaldehyde] are difficult to obtain in color-free highly polymerized condition. . .". Prior art processes for preparing phenol-formaldehyde resins provide products which range in color from deep yellow to dark brown. Since the cleaning or polishing agent constitutes a major component of a dentifrice, a dentifrice containing such prior art resins will necessarily be similarly colored. It is well known that the coloring employed in a dentifrice can have a significant effect on consumer acceptance, and that a white product is generally preferred. Measures heretofore taken to provide phenol-formaldehyde resins of light color have adversely affected the ionic compatibility or cleaning and polishing characteristics of the resin.

Accordingly, it is an object of this invention to provide a process for preparing light-colored particulate phenol-formaldehyde resins.

It is a further object of this invention to provide a process for preparing a light-colored particulate phenol-formaldehyde resin which is especially suitable as a cleaning agent, particularly in a dentifrice containing ionic ingredients.

These and other objects are achieved by a process for producing a particulate phenol-formaldehyde resin, which comprises (in broad terms): refluxing and aqueous reaction mixture of phenol, formaldehyde and sodium hydroxide; adding maleic anhydride and citric acid to the reaction mixture; dehydrating the reaction mixture; curing the dehydrated material in boiling water; heating the cured material to effect drying and further curing; reducing the particle size of the resin thus obtained to a means particle diameter ranging from about $5\mu$ to about $40\mu$; additionally curing the particulate resin in boiling water; and drying the particulate resin.

A separate and distinct process for preparing a similar phenol-formaldehyde resin is disclosed in the U.S. patent application of Frank S. Adams, Jr., filed concurrently herewith.

The conditions of the process of this invention, particularly the temperature, time, and proportions of reactants in the various reactions, are important as is hereinafter more fully described, to achieve production of the desired product, i.e., a high-cleaning low abrasive, light-colored, ionically compatible, particulate resin.

In the first step in preparing the light-colored resinous cleaning agent, formaldehyde, phenol and sodium hydroxide are mixed together. Formaldehyde is commonly available as a 37% aqueous solution containing 11% methanol and this is satisfactory; medium to high strength sodium hydroxide can be used (1N to 20N); and technical or reagent grade phenol is readily available and satisfactory. The concentrations of the starting materials per se in the reaction mixture are not critical so long as the proper proportions of the ingredients with respect to each other are carefully observed.

The formaldehyde to phenol molar ratio must be within the range of from about 1:1 to about 3:1, preferably about 2.3:1. The sodium hydroxide to phenol molar ratio must be within the range of from about 0.01:1 to about 0.50:1, preferably 0.24:1. These molar ratios are critical: a formaldehyde/phenol molar ratio greater than about 3:1 and a sodium hydroxide/phenol molar ratio greater than about 0.50:1 renders the reaction highly exothermic and difficult to control during the succeeding refluxing operation. A sodium hydroxide/phenol molar ratio of less than about 0.01:1 results in low yields of final product which is undesirable and uneconomical. A formaldehyde/phenol molar ratio less than about 1:1 renders the final product thermo-plastic rather than thermo-setting. Thermo-plastic resins are generally considered unsatisfactory as dental cleaning agents because of insufficient hardness and/or rigidity to clean and polish dental enamel.

The formaldehyde, phenol and sodium hydroxide solution is placed in reflux apparatus, heated and allowed to reflux at from about 70° C. to about 105° C. for a period of time ranging from about 30 minutes to about 50 minutes. Preferred conditions for the refluxing step are a temperature of 100° C. and a time of 45 minutes. The lower temperature limit is determined by the boiling point of the solution. The upper temperature and longer time limits must not be exceeded if a light-colored product is to be obtained. The shorter time limit is necessary to insure proper formation of certain unidentified intermediate products which react together in subsequent steps.

The second step of the process involves adding citric acid and maleic anhydride to the refluxed reaction mixture of the first step which preferably is still in the reflux apparatus. During this addition the temperature of the reaction mixture must be greater than about 80° C. and less than about 97° C.; this temperature is preferably maintained at about 95° C. The 80° C. temperature minimum is determined by the solubility of the chemicals which are added. The 97° C. temperature maximum must not be exceeded or the reaction will go out of control. For this same reason, the materials should be added slowly with uniform stirring.

The quantity of citric acid added is such that the molar ratio of citric acid to original phenol ranges from about 0.05:1 to about 0.2:1, preferably about 0.14:1. This and the following ratio are based on the amount of "original" phenol because some phenol has reacted at this stage and it is difficult to precisely measure the quantity of phenol still present in the reaction mixture. Citric acid is used instead of other acids in order to obtain a resinous product which is not only a good cleaning agent but is also light-colored.

The quantity of maleic anhydride added is such that the molar ratio of maleic anhydride to original phenol ranges from about 0.005:1 to about 0.15:1, preferably 0.025:1.

The above stated molar ratio ranges for citric acid/phenol and maleic anhydride/phenol are especially critical because non-compliance therewith will result in a final product that is either a poor cleaning agent or is darkly colored. If the reaction mixture is viscous, water is preferably added along with the citric acid and maleic anhydride.

After the citric acid and maleic anhydride have been added, the reaction mixture is exposed to the atmosphere, either by venting or removing the reflux apparatus, and heated to cause dehydration. Maintaining a temperature ranging from about 100° C. to about 105° C., preferably about 100° C. for about 40 minutes, accomplishes the dehydration. During this step the reaction mixture is a white mass floating in an aqueous solution; when dehydration is complete, the reaction mixture is a solid white mass with the consistency of taffy candy.

In the next step of the process, the taffy-like material previously obtained is subjected to a boiling water bath which cures the resin and makes it hard and brittle. This treatment is carried out at 100° C., preferably for about 2 hours. After the boiling water treatment, the resin is then preferably quenched or cooled by placing it in water of room temperature. A small amount of sulfuric acid is preferably added to either the boiling water or the quenching water, e.g., .5% to 15% by weight of the water, to facilitate cross-linking of the resin.

The next step in the process involves drying and further curing. The resin is preferably placed on shallow trays and heated in a forced air oven for about ½ hour to about 18 hours at a temperature ranging from about 70° C. to about 130° C., preferably for about 16 hours at about 85° C.

After this forced air drying step, the resin is reduced to a particulate form; this step of the process involves size reduction of the resin to a mean particle diameter ranging from about $5\mu$ to about $40\mu$. Preferably, few particles larger than about $20\mu$ are allowed to remain, i.e., not more than 5%. Larger particles than about $20\mu$ tend to feel gritty in the mouth and to stick between teeth. Small particles, i.e., less than about $5\mu$, are relatively ineffective in cleaning teeth. This step can be carried out by use of any conventional size-reduction equipment such as a ball mill, impact mill, pulverizer, or the like taking due care to avoid overheating of the resin, i.e., heating above 50° C.

After size reduction has been effected, additional curing is performed on the resin particles; placing the product in boiling water at about 100° C., preferably for about 1 hour at this point in the process renders the product harder and therefore a better cleaning agent is obtained.

After the last boiling water treatment, the particulate resin can be dried by any known manner to obtain the final product.

Thus, in more precise terms, the process of this invention comprises: (1) refluxing an aqueous reaction mixture of phenol, formaldehyde, and sodium hydroxide at a temperature ranging from about 70° C. to about 105° C. for a period of time ranging from about 30 minutes to about 50 minutes, the molar ratio of formaldehyde to phenol ranging from about 1:1 to about 3:1 and the molar ratio of sodium hydroxide to phenol ranging from about 0.01:1 to about 0.50:1; (2) after said period, maintaining the temperature of the reaction mixture within the range of from about 80° C. to about 97° C., and adding thereto maleic anhydride and citric acid, the molar ratio of maleic anhydride to original phenol ranging from about 0.005:1 to about 0.15:1 and the molar ratio of citric acid to original phenol ranging from about 0.05:1 to about 0.2:1; (3) dehydrating the reaction mixture by heating at a temperature of from about 100° C. to about 105° C., preferably for about 40 minutes; (4) curing the dehydrated material by placing it in boiling water, preferably for about 2 hours; (5) drying and further curing the resin thus obtained at a temperature of from about 70° C. to about 130° C. for a period of time ranging from about ½ hour to about 18 hours; (6) reducing the size of the dry resin to a mean particle diameter ranging from about $5\mu$ to about $40\mu$; (7) additionally curing the particulate resin by placing it in boiling water, preferably for about 1 hour; (8) drying the particulate resinous product.

Phenol-formaldehyde resins prepared by the above-described process are light-colored, have a high ionic compatibility, and are excellent dental cleaning agents, all of which properties are illustrated in the following examples.

EXAMPLE I 200 grams of phenol (Dow Chemical Co., reagent grade), 400 grams of formaldehyde (Baker Chemical Co., 37% formaldehyde solution containing 11% methanol and balance water), and 20 grams of NaOH (50 ml. of a 10 N solution) were mixed together in a one liter reaction flask to which a reflux column with a cold water jacket and a Dry Ice trap were attached.

Heat was applied to the flask by means of a heating mantle and the mixture was allowed to reflux at 94–97° C. for 45 minutes.

5 grams of maleic anhydride, 63 grams of citric acid and 100 grams of demineralized water were slowly (over a period of 3 minutes) added to the reaction mixture after which the reflux apparatus was removed, venting the mixture to the atmosphere. During this step, the temperature was maintained at about 95° C.

Heat was applied to dehydrate the mixture at a temperature of 105° C. for 40 minutes. A solid material (577 grams) remained in the reaction flask; this material was then removed and placed in 100 grams of boiling (100° C.) water for 2 hours.

After the 2 hour boiling water cure, the resin was quenched by placing it in 10,000 grams of water at room temperature (25° C.) containing 50 grams of sulfuric acid. The water was drained away and the resin was placed on "Teflon"-lined trays in a forced air oven at 85° C. for 16 hours for further curing.

The cured resin was subjected to ball-milling in a Mikro Pulverizer in the presence of Dry Ice for 20 hours at which time microscopic examination showed the particle size to range from $5\mu$ to $40\mu$. The resin particles were placed in boiling water (100° C.) for one hour and were then allowed to dry at room temperature (25° C.).

The final product, a highly polymerized, cross-linked, thermo-setting, particulate resinous cleaning agent, was very light in color (not pure white but easily characterized as "off-white").

Cleaning grade

White nylon blocks having a surface measuring 10mm x 12mm were ground smooth, washed and dried. One drop of ethyl acetate was placed on the level, dry, dust-free surface and allowed to spread. Then three drops of a mixture consisting of two parts ethyl acetate and one part of high gloss black lacquer were applied. In one minute the lacquer dried to a tacky surface and drying was completed in three ten-minute stages. The blocks were covered with metal cans for the first stage; the cans were tilted to allow partial access of room air currents during the second stage, and the cans were removed for the third stage. Such a drying gives uniform and reproducible films. The blocks were heated for twenty minutes, twelve inches below a 375-watt heat lamp, and then cooled. The blocks were prepared in sets of 200 to 300. The blocks were inserted in slurries of cleaning agents to be tested and brushed mechanically by toothbrushes moving back and forth across the face of the block under uniform pressure. The slurries of test materials were of equal viscosity (70 cps. at room temperature) rather than of equal weights in order to approximate more closely the conditions which would be encountered when using the cleaning material being tested in a toothpaste. The blocks were brushed 3000 double strokes. Reflectance measurements were then taken with a Photovolt Reflectometer on the brushed surface.

The above test was performed using the resin prepared in Example I as one test material and a standard dental cleaning agent, calcium pyrophosphate ($Ca_2P_2O_7$), as the other test material. The reflectance measurement, read directly from the Reflectometer, was 55 units for the phenol-formaldehyde resin compared to 63 units for the $Ca_2P_2O_7$. This means that the resin was nearly identical to standard calcium pyrophosphate in terms of cleaning ability and dental abrasion.

*Compatibility test*

A solution was prepared which consisted of 250 parts of glycerine, 250 parts of water and 4 parts of stannous fluoride. To 25 parts of this solution were added 20 parts of the cleaning agent to be tested and 5 parts of water. To a blank (or control) sample 25 parts of water free from cleaning agent was added to 25 parts of the solution. The air in the samples was replaced with nitrogen before capping tightly to prevent oxidation of the stannous ions. The samples were then stored at room temperature. The presence of glycerine retards the natural hydrolysis of the stannous ions and thus permits a better measure of the rate of absorption of the ions by the cleaning agent. At intervals the concentration of the stannous ions and fluoride ions was determined iodimetrically. The compatibility was measured in terms of percent stannous ions and percent fluoride ions remaining in the sample (relative to the blank sample) at the end of 7 days.

The above test was performed using the resin prepared in Example I as one test material and a standard dentifrice cleaning agent, calcium pyrophosphate, as another test material. The results of these tests are shown below:

IONIC COMPATIBILITY SCORES

| Test | Stannous ion, percent remaining after seven days | Fluoride ion, percent remaining after seven days |
|---|---|---|
| $Ca_2P_2O_7$ (standard) | 2 | 30 |
| Resin (prepared in Example I) | 50 | 97 |

It can be seen from the above data that the phenol-formaldehyde resin prepared by the process of this invention exhibits a high ionic compatibility as compared to a standard dentifrice cleaning agent.

Thus, the resins prepared by the process of this invention are useful as a dentifrice cleaning agent and are especially useful in combination with ionic ingredients. Further, they are not dark colored as are previously known phenol-formaldehyde cleaning agents and are therefore readily adaptable for use in a desirable white or other light-colored dentifrice.

What is claimed is:

1. A process for preparing a light colored particulate phenol-formaldehyde resinous dentifrice cleaning agent, which comprises:
   (1) refluxing an aqueous reaction mixture of phenol, formaldehyde, and sodium hydroxide at a temperature ranging from about 70° C. to about 105° C. for a period of time ranging from about 30 minutes to about 50 minutes, the molar ratio of formaldehyde to phenol ranging from about 1:1 to about 3:1 and the molar ratio of sodium hydroxide to phenol ranging from about 0.01:1 to about 0.50:1;
   (2) after said period, maintaining the temperature of the reaction mixture within the range of from about 80° C. to about 97° C., and adding thereto maleic anhydride and citric acid, the molar ratio of maleic anhydride to original phenol ranging from about 0.005:1 to about 0.15:1 and the molar ratio of citric acid to original phenol ranging from about 0.05:1 to about 0.2:1;
   (3) dehydrating the reaction mixture by heating at a temperature of from about 100° C. to about 105° C.;
   (4) curing the dehydrated material by placing it in boiling water;
   (5) drying and further curing the resin thus obtained at a temperature of from about 70° C. to about 130° C. for a period of time ranging from about ½ hour to about 18 hours;
   (6) reducing the size of the dry resin to a mean particle diameter ranging from about 5μ to about 40μ;
   (7) additionally curing the particulate resin by placing it in boiling water;
   (8) drying the particulate resinous product.

2. A process for preparing a light-colored particulate phenol-formaldehyde resinous dentifrice cleaning agent, which comprises:
   (1) refluxing an aqueous reaction mixture of phenol, formaldehyde, and sodium hydroxide at a temperature of 100° C. for 45 minutes, the molar ratio of formaldehyde to phenol being 2.3:1 and the molar ratio of sodium hydroxide to phenol being 0.24:1;
   (2) after said period, maintaining the temperature of the reaction mixture at 95° C., and adding thereto maleic anhydride and citric acid, the molar ratio of maleic anhydride to original phenol being 0.025:1 and the molar ratio of citric acid to original phenol being 0.14:1;
   (3) dehydrating the reaction mixture by heating at 100° C. for 40 minutes;
   (4) curing the dehydrated material by placing it in boiling water for 2 hours;
   (5) drying and curing the resin thus obtained at a temperature of 85° C. for 16 hours.
   (6) reducing the size of the dry resin to a mean particle diameter ranging from about 5μ to about 40μ;
   (7) additionally curing the particulate resin by placing it in boiling water for about 1 hour;
   (8) drying the particulate resinous product.

No references cited.

WILLIAM H. SHORT, *Primary Examiner.*

H. E. SCHAIN, *Assistant Examiner.*